United States Patent [19]

Dessenberger et al.

[11] Patent Number: 5,765,883
[45] Date of Patent: Jun. 16, 1998

[54] ADJUSTABLE PRESSURE RELIEF LATCH

[75] Inventors: Arthur W. Dessenberger, Riverside; Frank Thomas Jackson, Corona, both of Calif.

[73] Assignee: Hartwell Corporation, Placentia, Calif.

[21] Appl. No.: 792,956

[22] Filed: Jan. 22, 1997

Related U.S. Application Data

[63] Continuation of Ser. No. 502,484, Jul. 14, 1995, abandoned.

[51] Int. Cl.⁶ ............................................. E05B 65/10
[52] U.S. Cl. ............................. 292/92; 292/240; 292/252
[58] Field of Search .............................. 292/92, 93, 252, 292/DIG. 4, 240, 241, 197, 261, DIG. 60, DIG. 61, 203, 204, 207; 244/118.2, 129.4, 129.5, 131, 132

[56] References Cited

U.S. PATENT DOCUMENTS

| | | | |
|---|---|---|---|
| 309,181 | 12/1884 | Woodrich et al. | 70/46 |
| 512,593 | 1/1894 | Webster et al. | 292/213 |
| 1,058,584 | 4/1913 | Hendricks | 292/252 |
| 2,016,519 | 10/1935 | Schmidt | 292/78 |
| 2,832,623 | 4/1958 | Goleman | 292/252 |
| 2,848,263 | 8/1958 | Miller | 292/78 |
| 2,890,475 | 6/1959 | Carlson | 292/92 |
| 3,250,558 | 5/1966 | McClintock | 292/229 |
| 3,435,643 | 4/1969 | Pollack | 292/92 |
| 3,571,977 | 3/1971 | Abeel | |
| 4,045,063 | 8/1977 | Fletcher et al. | 292/110 |
| 4,230,352 | 10/1980 | Sealey et al. | 292/341.17 |
| 4,543,889 | 10/1985 | Fritz | 105/377 |
| 4,653,784 | 3/1987 | Lee | 292/71 |
| 4,772,054 | 9/1988 | Schreiber | 292/252 |
| 5,177,988 | 1/1993 | Bushnell | 292/252 |

OTHER PUBLICATIONS

Hartwell Catalog, pp. 6.1, 6.2, 6.3, 6.4 and 6.5.
Hartwell Drawing H2620.
Hartwell Drawing H2371.
Hartwell Drawing H3916.

*Primary Examiner*—Steven N. Meyers
*Assistant Examiner*—Gary Estremsky
*Attorney, Agent, or Firm*—Pretty, Schroeder & Poplawski

[57] ABSTRACT

A pressure relief latch for latching a first panel to a second panel and for release under pressure, including a housing for mounting on the first panel, a spring loaded detent carried in the housing, and a bolt having a pivot axis and pivotally mounted on the housing for latching engagement with the second panel, with the detent including a free roller and a compression spring positioned along a central spring axis perpendicular to the pivot axis, and with the bolt having a curved exterior shape with a detent notch for receiving the roller. The housing is closed about the spring except for a threaded opening at one end and a roller opening at the other end, and a threaded plug is positioned in the threaded end for loading adjustment. The roller may be spherical or cylindrical.

1 Claim, 3 Drawing Sheets

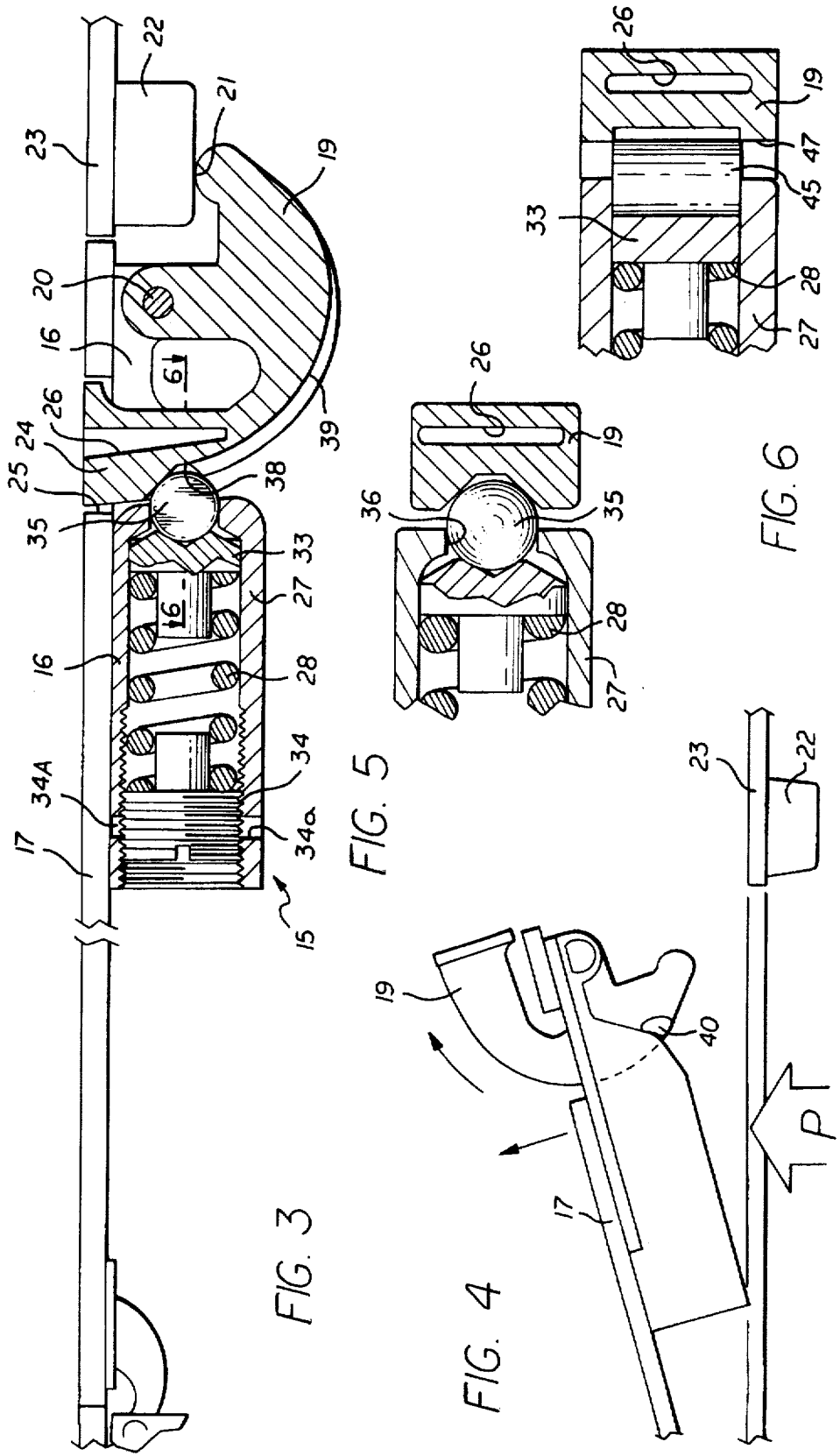

5,765,883

ADJUSTABLE PRESSURE RELIEF LATCH

This application is a continuation of application No. 08/502,484, filed 14 Jul. 1995, now abandoned.

BACKGROUND OF THE INVENTION

This relates to latch mechanisms for a dual purpose aircraft door which can open at a predetermined internal pressure and which can be quickly opened from the exterior for routine maintenance and inspection purposes. An early version of such a latch is shown in U.S. Pat. No. 3,571,977.

Various improvements on the pressure relief latch have been made in the interim and current models are illustrated in the Information Disclosure Statement documents. These latches utilize a curved bolt pivotally mounted in a housing with a spring detent roller engaging a detent notch in the bolt. In one embodiment, a double wound torsion spring is utilized with its axis parallel to the axis of the bolt and roller. In another embodiment, two compression springs spaced from each other and both perpendicular to the axis of the bolt are utilized.

One application for such pressure relief latches is in cowls for engines. Newer engines have higher internal operating pressures, and operators wish to have the pressure release latch not operate until the internal pressure approaches very close to the maximum permitted pressure. This means that the tolerances on adjustment and operation of the release latch become tighter and the requirements for repeatability become more severe. The pressure relief latch is adjusted at the factory to operate at a specific pressure. Problems are sometimes encountered in the field after many hours of usage, and the aircraft operator desires assurance that the pressure release latch will operate when needed and will not operate before it is needed.

Accordingly, it is an object of the present invention to provide a new and improved pressure relief latch which will have a narrower pressure operating range for a particular adjustment and which will maintain its adjustment during its operating life and which will be less subject to variations in release pressure due to dirt, wear and mechanical misalignments.

Other objects, advantages, features and results will more fully appear in the course of the following description.

SUMMARY OF THE INVENTION

The pressure relief latch of the present invention achieves these objects by having a fully enclosed adjustable spring mechanism which can be sealed after setting, and a freely rotating detent roller without any support shaft or the like, with the spring and roller on a central axis perpendicular to the axis of rotation of the bolt. The new design incorporates and utilizes fewer parts with fewer joints, as joints gall and wear during use and multiple parts introduce alignment problems. The pressure relief latch of the present invention utilizes only three friction points, two at the pivot for the bolt and one at the engagement of the roller with the bolt.

The presently preferred embodiment of the pressure relief latch of the invention provides for latching a first panel to a second panel and for release under pressure, including a housing for mounting on the first panel, spring loaded detent means carried in the housing, and a bolt having a pivot axis and pivotally mounted on the housing for latching engagement with the second panel, with the the detent means including a roller and a compression spring positioned along a central axis perpendicular to the pivot axis, and the bolt having an exterior curved shape with a detent notch for receiving the roller. The preferred embodiment further includes a housing closed about the spring except for a threaded opening at one end and a roller opening at the other end, and a threaded plug for positioning in the threaded end. The roller is freely rotating and may be spherical or cylindrical.

BRIEF DESCRIPTION OF THE DRAWINGS

FIG. 3 is an enlarged sectional view taken along the line 3—3 of FIG. 2;

FIG. 4 is a view similar to that of FIG. 3 illustrating the latch in the open condition;

FIG. 5 is a partial sectional view taken along the line 5—5 of FIG. 3;

FIG. 6 is a view similar to that of FIG. 5 showing an alternative and presently preferred embodiment of the invention with a cylindrical roller.

DESCRIPTION OF THE PREFERRED EMBODIMENTS

Figure 1:
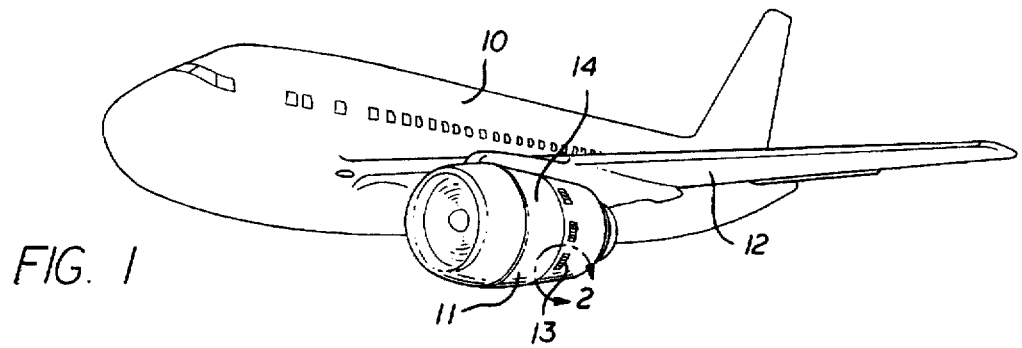
FIG. 1 is a view of an aircraft with an engine mounted on a wing and having a number of access doors with pressure relief latches.
Figure 2:
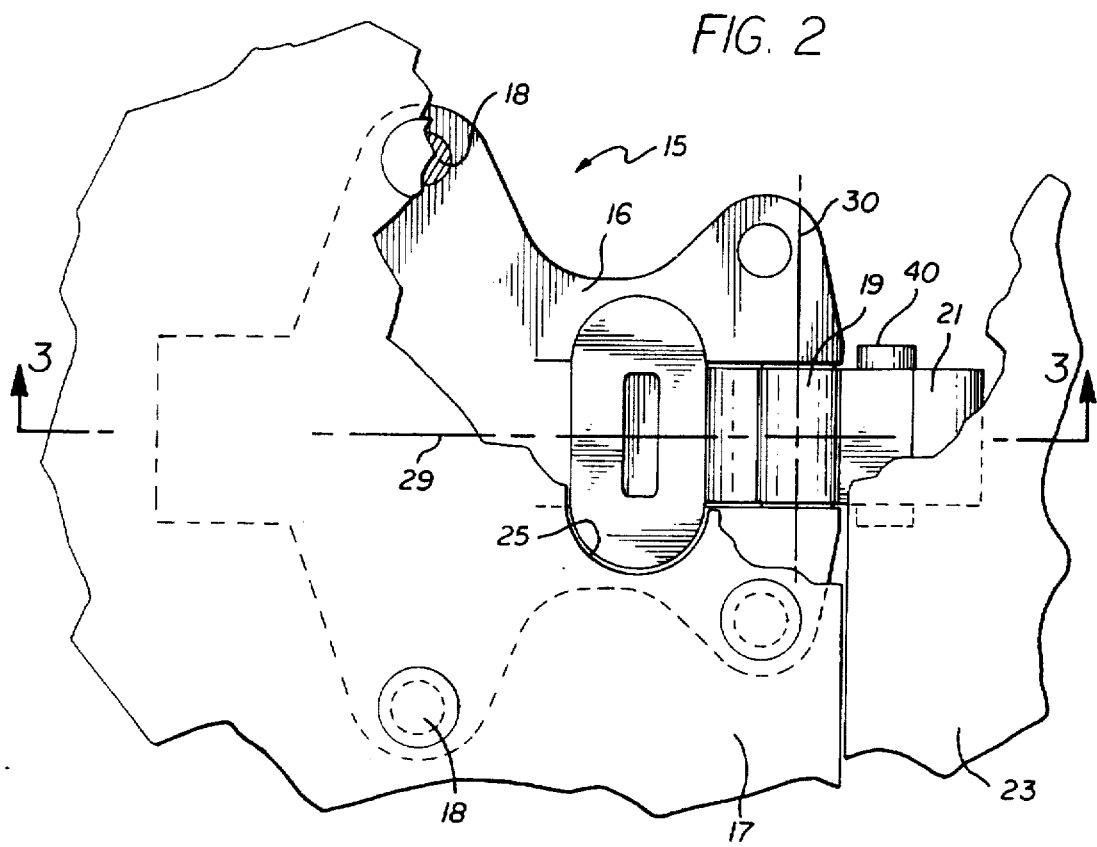
FIG. 2 is an enlarged partial view of a door panel with a pressure relief latch incorporating an embodiment of the invention with a spherical roller, installed thereon.

An aircraft 10 is shown in FIG. 1 with an engine 11 mounted on a wing 12 and having several access doors 13 in the cowl 14 of the engine. One of the access doors 13 is shown in greater detail in FIGS. 2–5.

One or more pressure relief latches 15 are mounted on the panel of the door for engaging a panel of the cowl for latching the door in the closed position. In the embodiment illustrated, the pressure release latch 15 includes a housing 16 mounted on a door panel 17 by a plurality of rivets 18.

A bolt 19 is pivotally mounted on the housing 16 by a shaft 20, with a portion 21 of the bolt engaging an extension 22 of a cowl panel 23 to maintain the latch in the latched condition.

The bolt includes a release portion 24 which projects upward through an opening 25 in the panel 17, preferably being flush with the outer surface of the panel. A slot 26 is provided in the bolt at this portion 24 for insertion of a screw driver for manually releasing the latch from the exterior of the cowl. This is a conventional operation for contemporary pressure release latches.

The housing 16 includes an enclosed spring section 27 for supporting a single compression spring 28 along a spring axis 29 which is perpendicular to the bolt axis 30.

A roller cup 33 and a threaded plug 34 are positioned within the spring enclosure of the housing 16, with each having an interior shaft for centering the spring thereon. A roller 35 is positioned on the roller cup in an opening 36 in the spring enclosure. The pressure within the cowl at which the latch will release automatically is adjusted by rotating the threaded plug 34. After the desired operation has been achieved, the threaded plug may be locked in place, as by punching through the lateral openings 34a in the housing spring section 27. The open end of the spring enclosure may be filled with a sealant.

The exterior of the bolt 19 is curved in shape, as best seen in FIG. 3. A detent notch 38 is provided in the bolt for receiving the roller 35. Preferably the radius of curvature of the bolt decreases moving from the detent notch 38 toward the end 21 to reduce the loading on the roller as the latch opens. In the embodiment utilizing a spherical roller, a groove 39 of decreasing depth leading from the detent notch may be used for centering of the roller during actuation. The groove preferably has flat sides to provide two point contacts with the spherical roller. Protruding ears 40 may be provided on each side of the bolt for limiting clockwise rotation during opening, as seen in FIG. 4.

The pressure relief latch is shown in the latched condition in FIG. 3. Upward pressure on the door panel, as shown by the large arrow P in FIG. 4 urges the door panel upward. Upward movement of the door panel is resisted by the engagement of the roller 35 with the bolt 19. When the interior pressure reaches a predetermined value, the pressure at the bolt—roller engagement is sufficient to compress the spring 28, permitting the roller to move out of the detent notch, with the bolt moving clockwise and the panel moving counterclockwise as seen in FIG. 4. When the pressure reduces, the latch can be relatched in the normal manner when on the ground.

Figure 7:
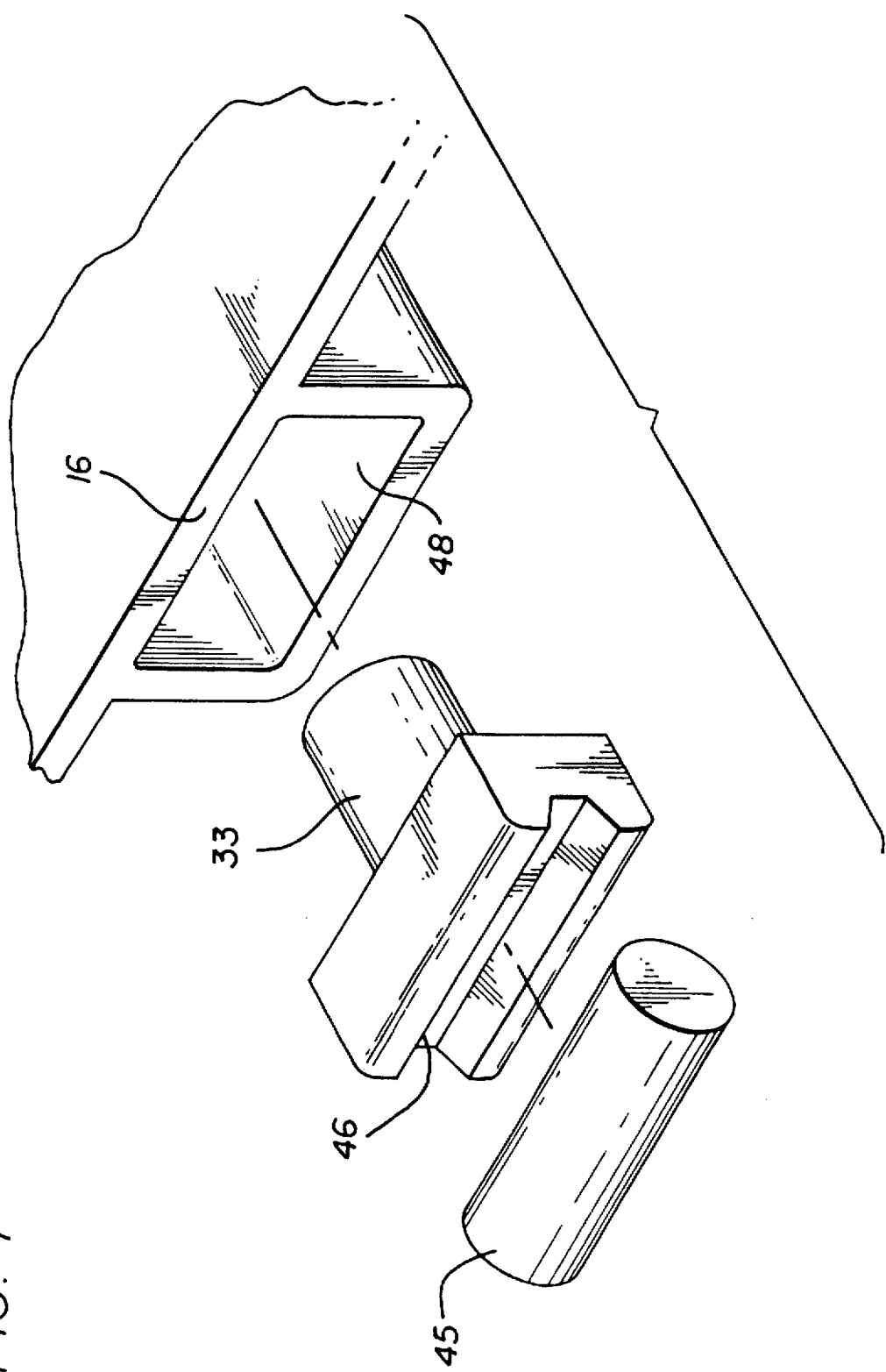
FIG. 7 is a perspective view showing the installation of the cylindrical roller of FIG. 6.

An alternative and presently preferred embodiment for the roller and bolt is shown in FIGS. 6 and 7, with a cylindrical roller 45 riding in a groove 46 of the roller cup 33, and with a channel shaped detent notch 47 in the bolt. Preferably there is no exterior groove corresponding to the groove 39 of FIGS. 3 and 5. The opening 48 in the housing 16 is of a shape to receive the roller cup 33. With the cylindrical roller there is a single contact point between roller and bolt. The operation of the latch with the cylindrical roller is the same as with the spherical roller.

Thus, it is seen that the pressure relief latch of the present invention utilizes fewer parts than prior designs with a corresponding reduction in joints and connections which lead to misalignment and friction. The contacts for moving parts are the rotation of the bolt 19 on the shaft 20 and the engagement of the roller 35, 45 with the detent notch 38, 47 of the bolt. The single spring construction with the spring axis perpendicular to the bolt axis maintains alignment of the components, in contrast to the dual spring construction of prior designs which permit lateral motion of components. Also the spring is enclosed thereby substantially blocking entrance of dust and moisture into the spring enclosure.

All of these improvements result in the desired reduction of the plus/minus tolerance on pressure release and the ability to set the actual pressure release pressure closer to the maximum operating pressure. Also the new and unique construction permits the new design to pass more severe sand and dust tests, fatigue tests and endurance tests, all of which have become increasingly stricter in recent time.

We claim:

1. In a pressure relief latch for latching a first panel to a second panel and for release under pressure, the combination of:

a housing for mounting on the first panel, said housing having a tubular interior with open ends;

spring loaded detent means carried in said housing; and a bolt having a pivot axis and pivotally mounted on a shaft in said housing for rotation on said pivot axis and latching engagement with the second panel;

said detent means including a free spherical ball roller without a support shaft and positioned at one of said open ends, a roller cup within said tubular interior and engaging said roller for maintaining said roller in a centered position, a compression spring positioned in said tubular interior along a central spring axis perpendicular to said pivot axis, and a threaded pressure adjustment plug for said spring at the other of said open ends, with said free roller maintained in place by said bolt, housing roller cup and spring; and said bolt having a continuous convex curved exterior shape for engaging said roller, with a groove in said curved exterior shape, with a detent notch in said curved exterior shape for receiving and retaining said roller, and with the depth of said groove reducing along said curved exterior shape from a magnitude less than the depth of said detent to zero;

with external pressure on said first panel and housing pushing said roller out of said detent notch against the force of said compression spring and with said bolt rotating out of engagement with said second panel in response to pressure on said first panel when said roller is moved out of said notch along said groove in said curved exterior shape.

* * * * *